United States Patent [19]
Mukherjee et al.

[11] Patent Number: 6,101,547
[45] Date of Patent: Aug. 8, 2000

[54] INEXPENSIVE, SCALABLE AND OPEN-ARCHITECTURE MEDIA SERVER

[75] Inventors: Sarit Mukherjee, Lawrenceville; Ibrahim Kamel, Monmouth Junction; Dennis Bushmitch, Summit; Walid G. Aref, New Brunswick, all of N.J.

[73] Assignee: Panasonic Technologies, Inc., Princeton, N.J.

[21] Appl. No.: 09/114,771

[22] Filed: Jul. 14, 1998

[51] Int. Cl.[7] ..................................................... G06F 15/16
[52] U.S. Cl. ........................... 709/231; 709/230; 709/232
[58] Field of Search .................................. 709/231, 230, 709/232, 233, 227, 219, 102, 103

[56] References Cited

U.S. PATENT DOCUMENTS

| | | | |
|---|---|---|---|
| 5,515,511 | 5/1996 | Nguyen et al. | 709/219 |
| 5,758,086 | 5/1998 | Maegawa | 709/231 |
| 5,802,283 | 9/1998 | Grady et al. | 709/227 |
| 5,822,524 | 10/1998 | Chen et al. | 709/233 |
| 5,915,094 | 6/1999 | Kouloheris et al. | 709/231 |
| 5,938,734 | 8/1999 | Yao et al. | 709/232 |
| 5,941,951 | 8/1999 | Day et al. | 709/233 |

*Primary Examiner*—Zarni Maung
*Assistant Examiner*—Philip B. Tran
*Attorney, Agent, or Firm*—Harness, Dickey & Pierce, P.L.C.

[57] ABSTRACT

Multi-media servers provide clients with streaming data requiring soft real-time guarantee and static data requiring a large amount of storage space. The servers use a pull-mode protocol to communicate with clients through a real-time network. Separate data and control channels enhance the soft real-time capability of the server. The data channel conforms to open standard protocol. A switched data link layer for the control channel permits separate intrahost control messages that may be multicast and broadcast. The distributed file system selects a specific data block size based upon the compression technique employed to enhance soft real-time guarantee. A hierarchal data structure combined with merging empty data blocks minimizes disk fragmentation. Data blocks are striped across multiple disks to improve disk utilization. A local buffer and a queue for both read and write requests provides support for simultaneous read and write data streams.

8 Claims, 6 Drawing Sheets

INEXPENSIVE, SCALABLE AND OPEN-ARCHITECTURE MEDIA SERVER

BACKGROUND AND SUMMARY OF THE INVENTION

The present invention relates generally to networked multi-media systems. More particularly, the invention relates to an inexpensive, scalable, open-architecture multi-media server that can be used to store and retrieve data with either real-time or high volume requirements.

With the continued increase in the power of computers, there is a growing interest in low-cost networks capable of delivering multi-media selections, such as video and audio material. Hotel and airline entertainment systems, news editing, video on demand, and interactive television are among the more promising applications.

There are different types of data which can be distributed over a network. Streaming data types such as audio and video data have strict deadline requirements. Static data types, such as images and video objects, require large volumes of storage space. Networks that require the delivery of streaming data as well as static data place severe constraints on the media servers that are capable of meeting the requirements of both types of data objects. One method of meeting the requirements of both types of data objects has been to use powerful computers for the multi-media server. Examples of these types of computers are multi-processors, mini-computers, or high end work stations with enough storage and bandwidth to be able to serve the targeted number of clients. Typically these servers are extremely expensive and they are not scalable. The present invention solves this problem by employing distributed architecture server built on PC's using low cost off the shelf hardware components although other low cost computers could also be used. The server can initially be designed with a limited number of disks, network bandwidth, and memory cache. Then as the demand grows for more video data and video objects the capability of the server can be increased by adding more low cost hardware components such as disks, network interface cards, and memory cache.

The server file system combines a number of unique capabilities to enhance fault tolerance, usage of network bandwidth, and usage of storage space at the hardware level. Fault tolerance at the hardware level can be enhanced by using redundant storage devices so that data is not lost in case a disk crashes. At the software level, fault tolerance is improved by a local cache buffer for the storage devices to provide short-term streaming storage of data to enable faultless recovery from a disk crash. Fault tolerance is also improved by separating the control path from the data path at the data link layers. By separating the control and data paths it is possible to apply a higher quality of service to the control path than to the data path, resulting in more reliable operation. The data path implements a soft real time guarantee in which the server provides best efforts to service data requests from clients. The server includes a hierarchal file system that has the capability of handling different size data blocks resulting in improved utilization of the available storage space. Empty data blocks within the file system are merged together forming larger blocks to reduce fragmentation of the storage system. To enhance usage of network bandwidth and improve disk utilization data blocks can be striped over an array of disks.

For a more complete understanding of the invention, its objects and advantages, reference may be had to the following specification and to the accompanying drawings.

DETAILED DESCRIPTION OF THE PREFERRED EMBODIMENTS

Figure 1:
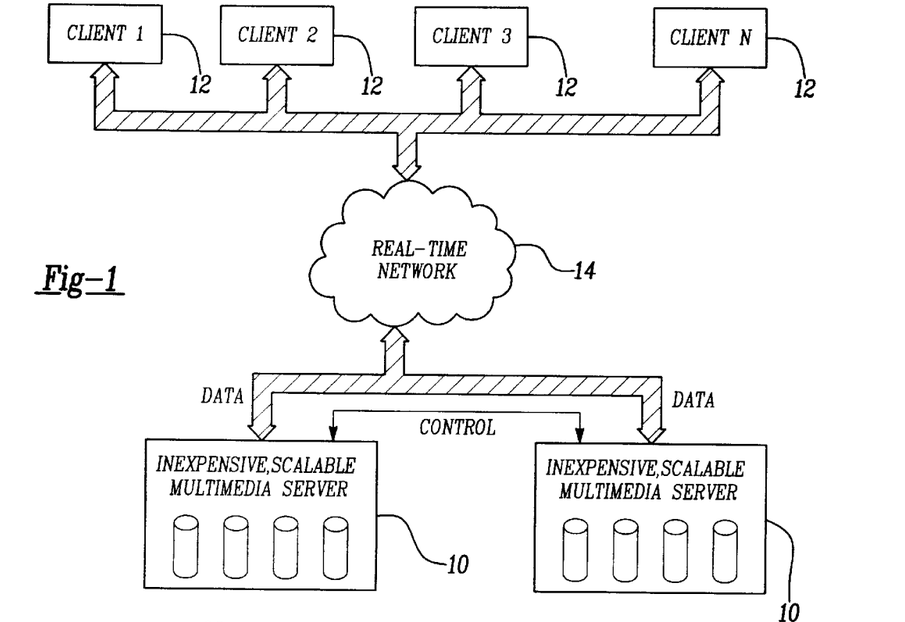
FIG. 1 is a network datagram illustrating a preferred embodiment of the invention.
Figure 2:
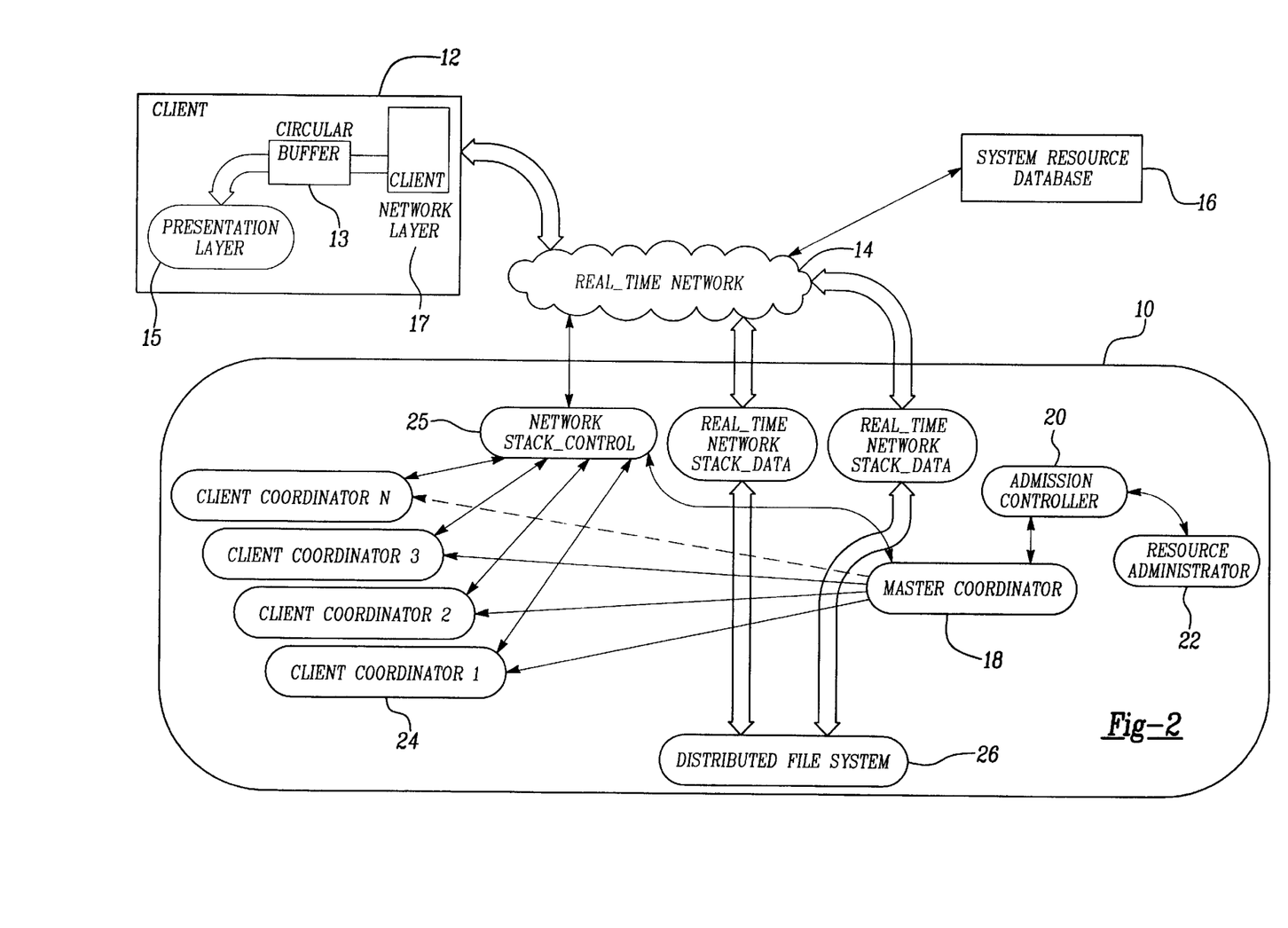
FIG. 2 is a datagram illustrating the internal structure of the invention.

Referring to FIGS. 1 and 2, an inexpensive, scalable, multi-media server 10 is depicted serving a plurality of clients 12 through a real-time network 14. The server 10 adopts an open standard protocol for the data channel at the data link layer to remain independent of the underlying physical network. Therefore, any network architecture can be used, such as Ethernet, Fibre channel, or ATM. FIG. 2 illustrates an exemplary multi-media system. This system consists of the preferred embodiment of the inexpensive, scalable, multi-media server 10, a real time network 14, a system resource data base 16, and at least one client 12. The server 10 comprises one or more PCS (preferably Pentium or higher) running an operating system such as the Microsoft Windows NT operating system. The clients 12 are ordinary PCS (preferably Pentium or higher) which include a presentation manager 15, a client network layer 17, and a local buffer 13. The client network layer 17 writes data blocks to local buffer 13 to account for variability in the time sequencing of downloading media objects. The system resource database 16 in the present invention is Microsoft Access relational database that is linked to the server 10 through ODBC. Clients 12 and the system resource data base 16 are connected to the server through a fast Ethernet network. The preferred embodiment is designed to have separate control and data channels. However, the invention will also operate over a network having a common channel for data and control.

The major system coordination functions of the multi-media server 10 are carried out by a master coordinator 18. The master coordinator 18 provides "level one gateway" functionality and a single point of entry into the system for all clients 12. An admission controller 20 executes the client admission policy of the server upon receiving a request from the master coordinator 18. The admission controller 20 interrogates the system resource database 16 and the resource administrator 22 in determining whether to grant the admission request. The resource administrator 22 monitors different server resources, such as, disk storage, disk bandwidth, network bandwidth, and CPU utilization. A client coordinator 24, corresponding to a unique client 12, is created by the master coordinator 18 upon approving a delivery request for the client. The client coordinator 24 manages all of the client session procedures. In response to a request from a client 12 the client coordinator 24 interrogates the system resource database 16 to determine whether the requested multi-media selection resides within the distributed file system 26 of the server 10. The distributed file system 26 stores the server data objects. The data objects are distributed over a real-time network to the clients 12. The present embodiment of the invention provides separate data and control channels, although a common channel is within the scope of the invention.

Figure 3:
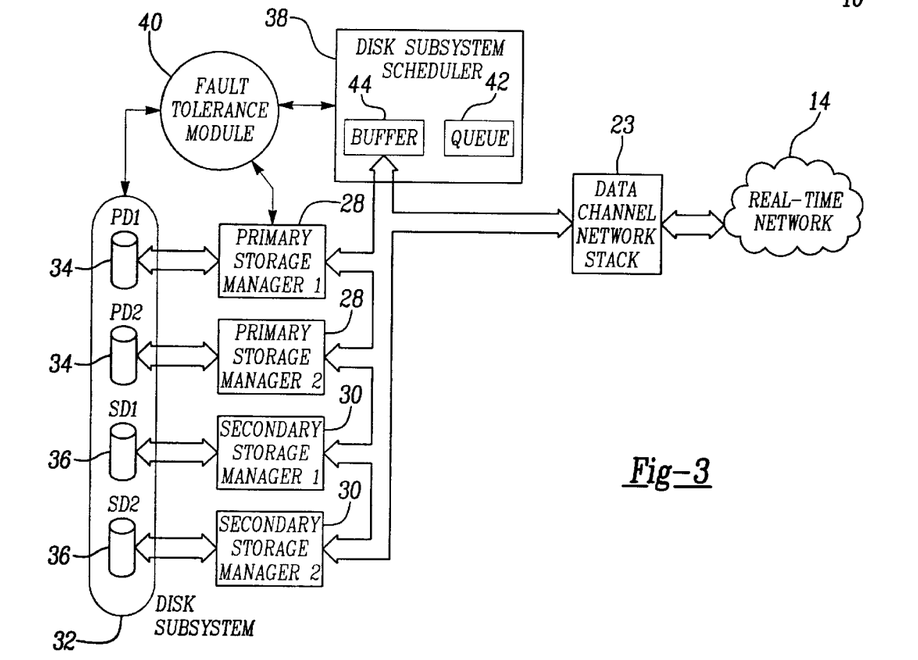
FIG. 3 is a datagram illustrating the distributed file system of the preferred embodiment of the invention.

Referring to FIG. 3, an exemplary distributed file system is illustrated. The presently preferred embodiment of the distributed file system includes two disk subsystems 32 housed within Windows NT host systems. Each disk subsystem has four identical SCSI disks. Within each disk subsystem two of the SCSI disks are primary disks 34, and the other two disks are secondary disks 36. Each of the disks is managed by a dedicated storage manager, although it is envisioned that a single storage manager may manage multiple disks or that multiple storage managers may manage portions of a single disk. A disk subsystem scheduler 38 optimizes both seek time and the deadline time of the file system 26. The scheduler 38 includes a queue 42 to maintain both read and write requests, and a buffer 44 to store data prior to writing it to the disk subsystem 32. A fault tolerance module 40 implements RAID level one disk mirroring resulting in 100% redundant disks. Mirroring increases data availability and improves response time when a disk fails.

Figure 7:
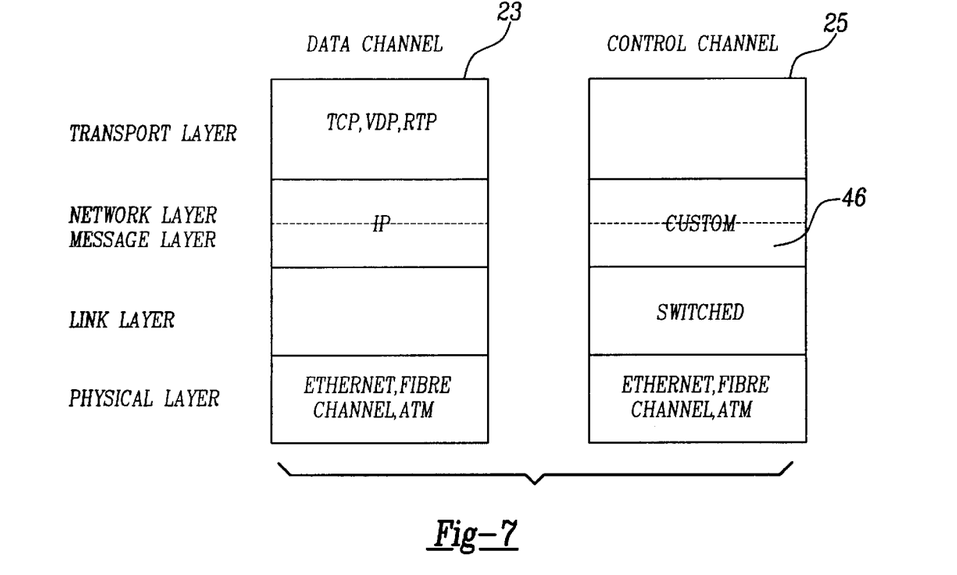
FIG. 7 is a datagram illustrating the data and control channel network stacks of the preferred embodiment of the invention.
Figure 8:
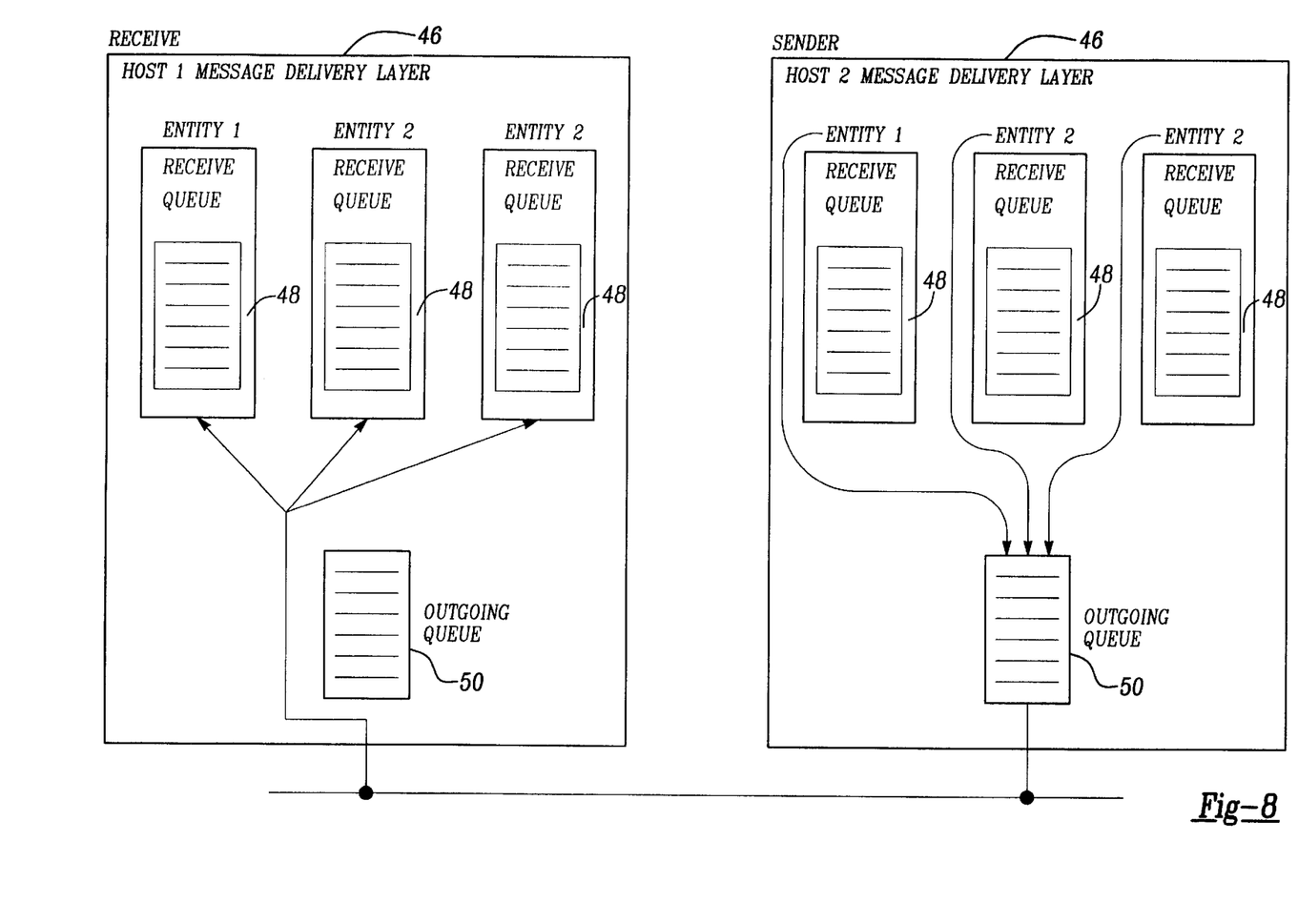
FIG. 8 is a datagram illustrating the message delivery layer of the control channel network stack.

The data and control channel network stacks of the preferred embodiment are illustrated in FIG. 7. The data channel network stack 23 conforms to an open protocol standard such as TCP, UDP, or RTP. A single network stack is employed for the data channel in each server. However, the principles of the invention may be readily extended to include multiple data channel network stacks in each server. The control channel employs a switched data link layer within the control channel network stack 25 and a unique network layer. Referring to FIG. 8, the message delivery layer 46 of the network layer provides host independent message exchange between sender and receiver pairs. Messages from server processes are sent to the message delivery layer 46 where they are stored in the outgoing queue 50. Queued messages having a local destination are routed by the message delivery layer 46 to the receive queue of the appropriate process. Queued messages having a remote destination are transmitted over the control network to the message delivery layer 46 of the remote host. The remote host then routes the message to the receive queue of the appropriate process. The low bandwidth requirements of the control path permits use of broadcast or multicast for control messages.

A client initiates a multi-media session by requesting a media object by file name. The request is sent to the master coordinator 18 through the control channel network stack 25. The master coordinator 18 interrogates the system resource database 16 to determine availability of the media object as well as block size, average consumption rate, and the file length. The master coordinator 18 also interrogates the admission controller 20 to determine if the server has the required resources to serve the new request. Upon approval of the request by the admission controller 20, the master coordinator 18 sends an admission approved message to the client 12. The message contains session management information such as approval, average consumption rate and data block size. The master controller 18 then creates a unique client coordinator 24 corresponding to the client 12. The client coordinator 24 manages all of the remaining client session procedures.

Pull-mode operation is employed to retrieve media objects. In pull-mode, clients repeatedly send requests to the server 10 requesting discrete data blocks until the entire media object has been received by the client. Using pull-mode provides the client 12 with more flexibility and better control of the local buffer 13. The client 12 is able to optimize usage of the local buffer 13 by adjusting the frequency of data block requests to avoid either overflow or underflow of the buffer. An alternative to pole mode is push mode. In push-mode a client sends a single request to the server requesting delivery of a media object. The server then sends data blocks to the client in a synchronized fashion irregardless of the status of the local buffer. In push-mode there are fewer control messages between the client and the server, however the client has no control over the status of its local buffer.

Figure 4:
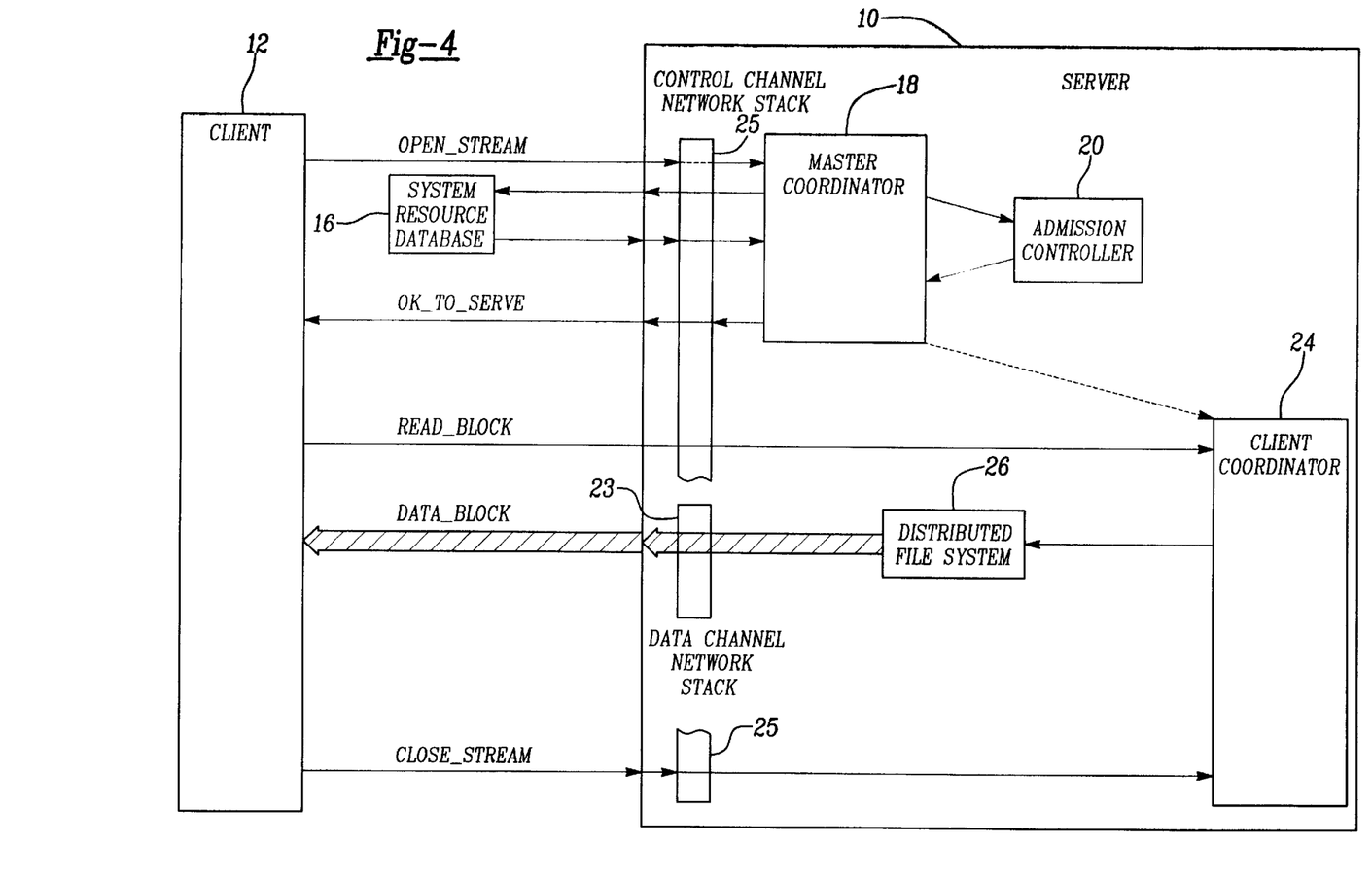
FIG. 4 is a datagram illustrating a read request by a client.

The client 12, upon receiving an approved admission request from the master coordinator 18 may begin pull-mode operation to receive the requested media object. The client 12 issues a read block message to the corresponding client coordinator 24. The client coordinator 24 forwards the read block message to the distributed file system 26. Referring to FIG. 3, within the distributed file system the request is entered into the queue 42 of the disk subsystem scheduler 38. The queue 42 maintains both read and write requests. The scheduler 38 employs a first come first serve service discipline when executing the queued requests. The scheduler 38 forwards requests from the queue 42 to the appropriate primary storage managers 28 which retrieve data from the primary physical storage devices 34 and send that data through the data channel network stack 23 to the client 12. At the same time the appropriate secondary storage managers 30 retrieve the same data from the secondary physical storage devices 36 and send that data to the buffer 44 within the disk subsystem scheduler 38. The buffered data is used for fault tolerance in case a primary disk fails during the read operation. Fault tolerance will be explained in a later section. The client 12 repeatedly sends requests to the client coordinator 24 requesting discrete data blocks until the entire media object has been received by the client 12. To end the retrieval session the client 12 sends a terminate message to the corresponding client coordinator 24. The master coordinator 18 then destroys the client coordinator 24. A similar form of pull-mode operation is also used for trick mode play. However, in trick mode the ID of the last frame played in the previous mode is included with the request to start delivering a media object.

Figure 5:
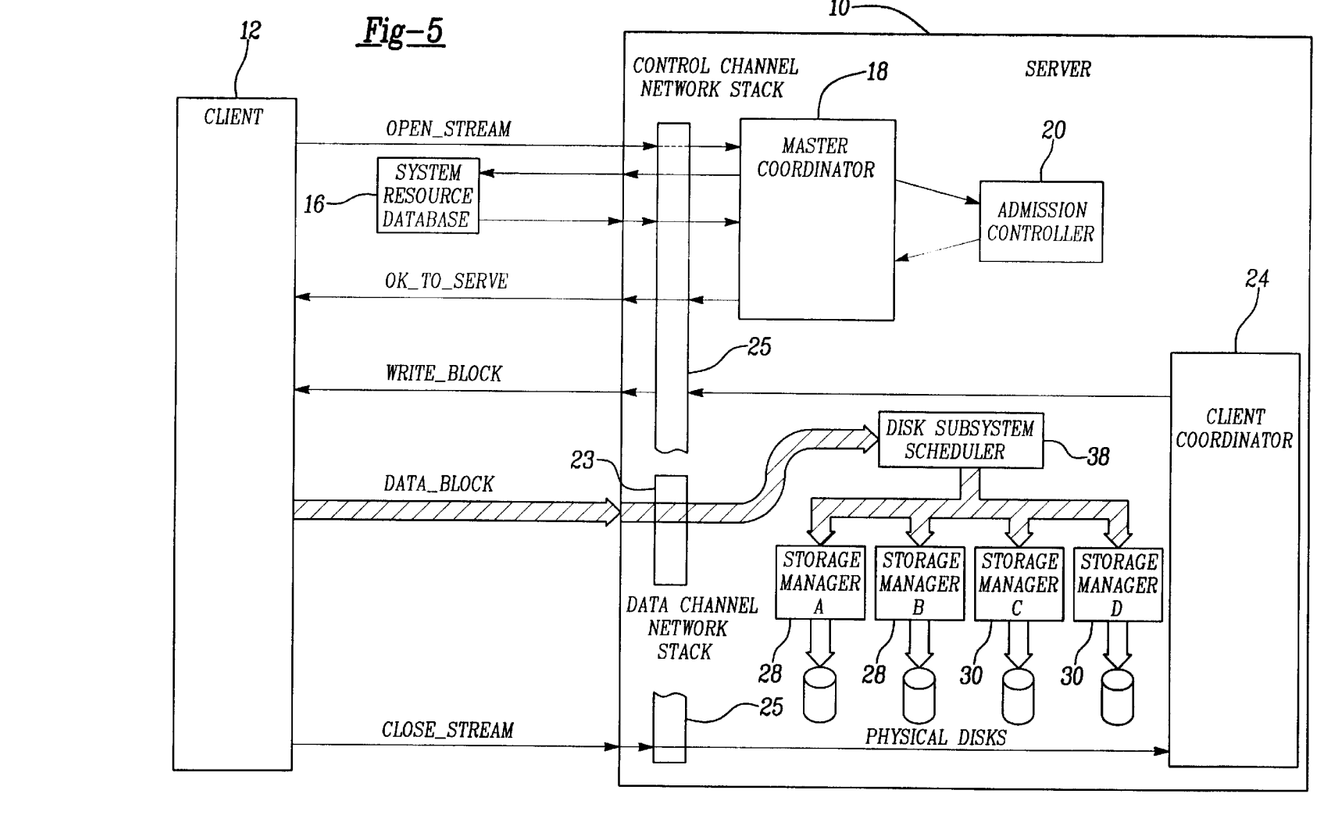
FIG. 5 is a datagram illustrating a write request by a client.
Figure 6:
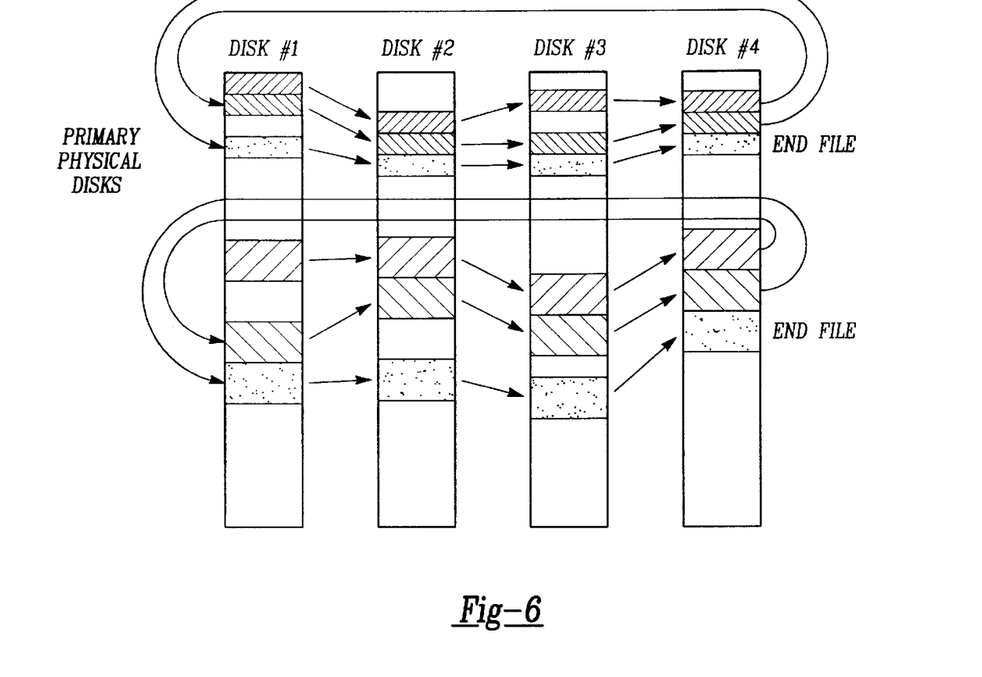
FIG. 6 is a datagram of disk striping.

Referring to FIG. 5, the server responds to a write request in a manner similar to a read request. The client 12 sends a write request to the master coordinator 18 through the control channel network stack 25. The master controller 18 interrogates system resource data base 16 to determine if the distributed file system 26 has the required resources available. The master coordinator 18 then interrogates the admission controller 20 to determine if the server has the required resources to serve a new request. Upon approval by the admission controller, the master coordinator 18 sends an approval response message to the client. The master coordinator 18 also creates a unique client coordinator 24 corresponding to the client. The client coordinator 24 sends a write request message to the client 12 requesting a block of data of the specified size. The client 12 sends the data block through the server data channel network stack 23 directly to the buffer 44 within the disk subsystem scheduler 38. Also, a write request associated with the data block is entered into queue 42. The scheduler 38 assigns a deadline for writing the data block to physical disk which is a function of the feed-in rate and the size of the buffer. Maintaining a single queue for read and write requests enhances simultaneous read and write capabilities. Once the write request advances to the top of queue 42 the data block in buffer 44 is striped across multiple disks (refer to FIG. 6). Disk striping across multiple disks increases disk utilization and minimizes bottlenecks by providing multiple read/write paths. The disk subsystem scheduler 38 varies the size of the data blocks stored to disk dependent on the compression scheme that is implemented. The capability of creating different block sizes enables the server to support real time streams with different consumption rates. The data blocks on the physical disks 34 are managed by a hierarchal structure, wherein empty blocks that are siblings in the hierarchal tree are merged together to form a larger block. Merging empty blocks minimizes fragmentation which would normally occur due to the repeated insertion and deletion of data blocks. The buffer 44, common queue 42 for read and write requests, and variable block size each contribute to the server's 10 capability of providing a soft real-time guarantee for read requests. A system that provides a soft real-time guarantee uses best efforts to execute all read and write requests. However, when data traffic exceeds the capabilities of the system, some read requests will not be executed in order to ensure that all write requests are honored. As data traffic increases an increasing number of read requests will not be executed resulting in a graceful degradation of video output. By controlling the maximum number of clients 12 admitted, block size of the data objects, the size of buffer 44, and the number of data channel network stacks in addition to other parameters, the number of simultaneous data streams that are served can be maximized.

The preferred embodiment of the invention incorporates hardware level fault tolerance by implementing RAID level 1 disk mirroring. All writes made to the primary disks 34 are also made to the secondary disks 36. Referring to FIG. 3, in the event of a secondary disk failure the corresponding secondary storage manager 30 reports the failure to the master coordinator 18. When a primary disk 34 fails the corresponding primary storage manager 28 reports the failure and the ID number of affected data block requests to the master coordinator 18. When a primary disk fails there is a period of time following the actual failure of the device before the server is notified. Data blocks stored in the buffer 44 of the scheduler 38 are used to replace data blocks lost during the initial disk failure period. Upon receipt of the failure notification, the master coordinator 18 promotes the secondary storage manager 30 to primary storage manager 28 and sends the ID number of the affected data blocks. The new primary storage manager 28 sends the indicated data blocks directly through the data channel network stack 23 to the client 12. When a previously failed disk once again becomes operational the corresponding storage manager notifies the master coordinator 18. Upon receipt of the notification the master coordinator 18 instructs the storage manager to rejoin the server 10 as a secondary storage manager 30.

From the foregoing it will be understood that the invention provides an inexpensive, scalable, multi-media server for servicing clients that desire data objects requiring either real-time delivery or large amounts of storage space. The server may be based upon low-cost PCS or other comparable hardware and is readily scaled, larger or smaller. The server is thus an efficient, robust implementation that is capable of providing significant flexibility in selecting a level of service to provide to a fluctuating number of clients.

While the invention has been described in its presently preferred embodiments, it will be understood that the invention is capable of certain modification and change without departing from the spirit of the invention as set forth in the appended claims.

What is claimed is:

1. A multimedia server for delivering data objects to a plurality of multimedia clients over a real-time network, said multimedia server comprising:

a master coordinator accessible through said network, for evaluating admission requests from said multimedia clients;

said master coordinator being operative, in response to requests for data objects from requesting multimedia clients that have been granted admission, to create client coordinators corresponding to each of the requesting multimedia clients, said client coordinators for providing session management procedures with the requesting multimedia clients and for requesting data objects; and a storage manager being operative, in response to a request for at least one data object from one of said client coordinators, to open a multimedia session with said requesting multimedia client, said storage manager having an associated data storage unit for storing streaming data representing at least one data object available for delivery, said data storage unit being configured to store data as a hierarchical set of data blocks, said data blocks being of selectable predetermined block size.

2. The multimedia server of claim 1 wherein said storage manager further includes data striping of said data storage unit.

3. The multimedia server of claim 1 for delivering data objects to at least one multimedia client over a real-time network, wherein said real-time network comprises separate data and control channels.

4. The multimedia server of claim 1 wherein said data storage unit employs disk mirroring to provide redundant disks.

5. The multimedia server of claim 1 further comprising a separate intrahost control channel for control messages between server hosts.

6. The multimedia server of claim 1 further comprising an admission controller.

7. The multimedia server of claim 1 further comprising a resource administrator.

8. A multimedia server for delivering data objects to a plurality of multimedia clients over a real-time network having separate data and control channels, said multimedia server comprising:

a master coordinator accessible through said network, for receiving admission requests from said multimedia clients;

an admission controller coupled to the master coordinator for executing a server admission policy, wherein an admission request that complies with the server admission policy is granted;

the master coordinator being operative, in response to requests for data objects from requesting multimedia clients that have been granted admission, to assign client coordinators corresponding to each of the requesting multimedia clients, the client coordinators for providing session management procedures with the requesting multimedia clients and for requesting data objects, wherein there is a corresponding client coordinator assigned to each of the requesting multimedia clients;

a storage manager being operative, in response to a request for at least one data object from one of the client coordinators, to open a multimedia session with a requesting multimedia client that corresponds to the client coordinator that requests the data object, said storage manager having an associated data storage unit for storing streaming data representing at least one data object available for delivery, said data storage unit being configured to store data as a hierarchical set of data blocks, said data blocks being of selectable predetermined block size; and said master coordinator being operative, in response to a terminate message from a departing multimedia client, to destroy the client coordinator corresponding to the departing multimedia client.

* * * * *